2,463,368

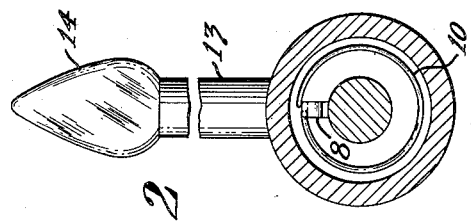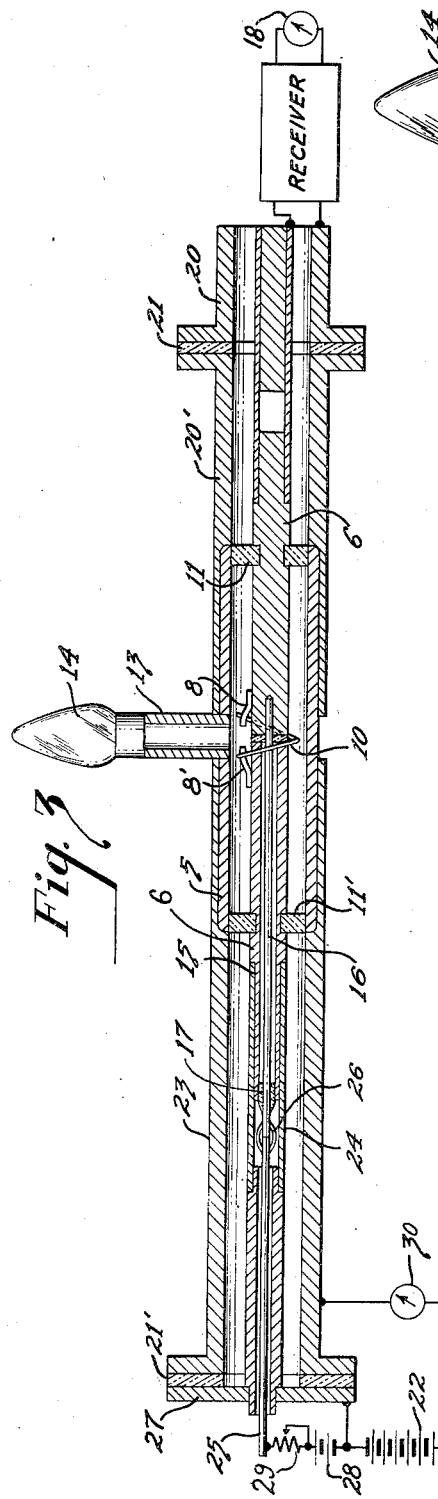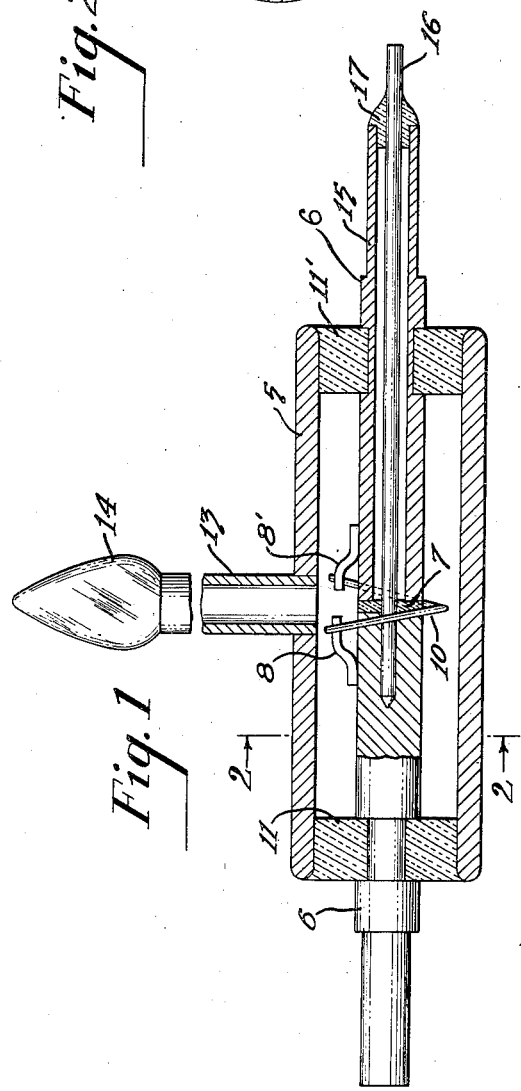
Inventor
Herbert A. Finke
William A. Zalesak
Attorney Patented Mar. 1, 1949

UNITED STATES PATENT OFFICE 2,463,368

COAXIAL ELECTRON DISCHARGE DEVICE

Herbert A. Finke, Brooklyn, N. Y., assignor to Radio Corporation of America, a corporation of Delaware Application January 24, 1947, Serial No. 724,208

7 Claims. (Cl. 315—39)

This invention relates to electron discharge devices and more particularly to vacuum tubes of special application used for generating noise currents.

In determining the noise factor of radio circuits and components, particularly receivers, it is convenient to generate noise currents from thermionic sources such as a diode vacuum tube. When measurements are made, considerable difficulty is experienced under certain conditions in connecting the conventional noise source, i. e., the electron discharge device producing the noise current, to the input circuit of the component under analysis. This difficulty arises from the necessity of knowing the impedance of the noise source, and at high frequencies the conventional noise source must be carefully tuned at each frequency at which a measurement is made. Moreover, since noise currents fall within a wide range of frequencies, it is desirable in measuring circuits to have a noise source whose impedance is independent of frequency in order to simplify the quantitative determination of the noise factor.

Heretofore, the above related conditions made measurements particularly difficult and very unreliable in the ultra high frequency range where the connection of the conventional noise current generator tube to the component under test required complicated tuned net-works and was often impossible to obtain.

A particular object of this invention is to provide a thermionic source producing noise currents which has a fixed coupling impedance independent of frequency within an extremely wide band of frequencies.

Another object of the invention is to eliminate the need of auxiliary matching net-works between the generator and the component under measurement.

A further object of the invention is to provide an electron discharge device which may be connected directly to apparatus provided with transmission line terminations.

A particular feature of the invention is that the electron discharge device and the matching impedance are combined into one unitary structure.

A particular advantage resulting from the application of this invention to noise factor measurement is the simple connection and termination in the characteristic impedance of the discharge device.

Other objects and advantages will be apparent from the following description of the invention pointed out in particularity in the appended claims and taken in connection with the accompanying drawing in which:

Fig. 1 is a side elevational view in cross-section of a two-element vacuum tube constructed in accordance with the invention;

Fig. 2 is a section along line 2—2 of Fig. 1; and

Fig. 3 is a schematic circuit showing the application of the novel tube in a noise factor measuring circuit, the connecting line elements being shown also in cross-section.

Referring to Fig. 1, the simple construction of the tube is readily observable. It consists essentially of a section of coaxial transmission line of such dimensions which will give a surge impedance generally encountered in the component elements to which the tube will be connected. In practice, this impedance may be 50 ohms. The transmission line section comprises a cylindrical outer conductor 5 which surrounds an inner conductor 6. The latter is electrically divided into two portions by means of an insulating washer 7 in order to provide direct current insulation between the supports 8 and 8' secured to each portion of the inner conductor 6, respectively. Connected between the supports 8 and 8' and coiled around the inner conductor 6 is a filamentary cathode 10. The spacing between the inner conductor 6 and the outer conductor 5 is effected by means of glass insulators 11 and 11' which fit over undercut portions of the inner conductor to provide a rigid mechanical assembly as well as compensation of the impedance change caused by the dielectric material.

Considering the general features outlined above, it becomes apparent that electrons emitted from the filamentary cathode 10 can be collected by the outer conductor 5 when properly biased with respect to the filament. Therefore, the outer conductor 5 is in fact the anode of the tube. In order to evacuate the device, there is provided a tubular portion 13 which may be sealed off by means of a glass bead 14 after the exhausting process.

It was mentioned before that the inner conductor 6 is electrically divided in order to provide terminals for the filament 10. It is desirable to bring out such terminals at one end of the tube leaving the other end free for connection to various apparatus. This is accomplished by extending one filament terminal within the inner conductor 6 and for this purpose the latter has a sleeve portion 15 accommodating a rod 16 insulated therefrom by means of a glass seal 17 which also provides the proper centering of the rod 16. The source of filament heating current may be applied between the sleeve portion 15 and the extended end of the rod 16. The other end of the rod 16 is firmly embedded in the inner conductor or it may be an integral part thereof, for example, by turning it down to the required diameter.

In the operation of a discharge device for determining the noise factor of a receiver or other electronic circuit, a source of anode potential is connected between the inner conductor 6 and the outer conductor anode 5. A variable source of heating current for the filament 10 is also connected between the sleeve portion 15 and the rod 16. The proper connections for such measurements is shown in Fig. 3. The receiver is schematically indicated by the block diagram with a suitable output or noise meter 18 attached to it. The input circuit of the receiver is shown by the section of coaxial transmission line 20 which is coupled to a transmission line 20' of similar characteristics which fits over the outer conductor 5 of the tube. The coupling between the two transmission lines 20 and 20' includes a dielectric ring 21 merely to insulate the receiver from the source of anode potential for the tube represented by the battery 22.

It is essential that the input circuit of the receiver under test terminate in the same impedance which this circuit normally has so as to simulate the conditions of practical operation. The discharge device per se does not and should not offer a load. By its particular construction as a transmission line section, which is the salient feature of this invention, it enables the continuation of the receiver input circuit in the characteristic impedance of its termination. In other words, the receiver input circuit may be extended while incorporating the noise current source without disturbing the electrical transmission characteristics of this circuit at a wide range of high operating frequencies. No conventionally constructed discharge device could be incorporated without seriously affecting the input circuit. To terminate the receiver input circuit in the characteristic impedance, a resistor of suitable value may be placed between the outer and the inner conductors of the tube at the free end of the terminals. However, in practice, it was found that this can better be accomplished by connecting a transmission line section which is so constructed as to have certain losses which equal the required load impedance. This is illustrated in Fig. 3 by the transmission line 23 which represents a lossy section that fits over the outer conductor 5 of the tube and has also an inner conductor 24 in the form of a sleeve which makes contact with the sleeve portion 15 of the inner conductor 6 of the tube and a rod 25 which makes contact with the rod 16 of the tube. These contacts are generally effected by close fitting design and a wiping contact spring if necessary. Such a spring 26 is shown for the rod 25. The transmission line section 23 may be closed by an end plate 27 insulated from the body of the transmission line by means of a disc 21' similar to the one used at the receiver end. The insulation provided by the disc 21' is necessary in order to permit application of heating current to the filament 10 through the inner conductor. The source of heating current is indicated schematically by the battery 28 including a variable resistor 29 for controlling the current applied to the filament 10.

To obtain a measurement of receiver noise factor, the noise power output of the receiver is observed in the output meter 18 with the current to the filament 10 turned off. The output meter may be any type of noise meter indicating the output power of the receiver. After noting the observation of the output meter, the filament current is applied and varied until the noise power output is exactly doubled. At this point the total emission of the tube is observed by means of a direct current meter 30 in the anode circuit. From this reading, the noise factor of the receiver may be determined from the following considerations. It is to be noted that the 50 ohm load provided by the transmission line 23 simulates the input circuit of the receiver when it is used with an antenna having a radiation resistance equal to this load. If the receiver noise factor is F and the receiver noise band is $\Delta f$, then with the noise source, that is, the tube de-energized, the total receiver noise may be considered as a single noise current generator at the antenna circuit of value $$\overline{i_{n1}^2} = \frac{4kT\Delta f \cdot F}{50}$$

where $k$ is Boltmann's constant $=1.37 \times 10^{-23}$ joules per degree K.

In addition, the tube may be considered as a noise current generator of value $$\overline{i_{n2}^2} = 2eI_d\Delta f$$

where I is the diode plate current as determined above, and $e$ is the electronic charge ($1.59 \times 10^{-19}$ coulombs).

The procedure of exactly doubling the receiver noise power output as previously stated, makes it possible to equate the last two expressions, or $$\frac{4kT\Delta f \cdot F}{50} = 2eI_d\Delta f$$

$$F = \frac{2e}{4kT} \times 50 I_d$$

$$F = 1000 I_d$$

where I is in amperes.

For I expressed in milliamperes, the noise factor in decibels becomes $10 \log_{10} I_d$ ($I_d$ in milliamperes).

The above example shows the aplication of the specially constructed tube for a certain receiver test and measurement. It is evident that a device of this type may have various other applications wherever it is desirable to maintain a certain circuit impedance and have at the same time an electron discharge device in this circuit without disturbing transmission characteristics. Although only a two-element tube has been described, it will be evident that other elements may be incorporated maintaining the same transmission line characteristics.

I claim:

1. An electron discharge device comprising a cylindrical anode electrode, a conductor coaxially supported in said anode electrode and comprising two axially-aligned spaced portions, one portion being hollow and the other portion having an extension through said hollow portion, a filamentary cathode bridging said spaced portions, and means including said anode electrode forming a closed envelope, said extension and said hollow portion extending through said envelope to serve as terminals for said filamentary cathode.

2. An electron discharge device including as elements an anode and a thermionic cathode, means for maintaining substantially uniform coupling impedance for said device independent of frequency within a wide range of frequencies comprising a section of coaxial transmission line consisting of an outer cylindrical conductor and an inner rod-like conductor incorporating said elements, said outer conductor constituting said anode, said inner conductor comprising two axially-aligned spaced portions, one portion being hollow and the other portion having an extension through said hollow portion, and a filamentary cathode bridging said spaced portions, said hollow portion and said extension being adapted to serve as terminals for said cathode.

3. An inner conductor for an electron discharge device, comprising two axially-aligned rods, a filamentary cathode bridging said rods, one of said rods being hollow, an extension from the other rod extending through said hollow rod, insulating means electrically separating said hollow rod from said other rod and extension, said extension and said hollow rod being adapted to function as terminals for said filamentary cathode.

4. An inner conductor in accordance with claim 3 wherein said two rods are of substantially uniform diameter.

5. An electron discharge device comprising a cylindrical anode electrode adapted to be evacuated and forming a housing for auxiliary electrodes, a conductor coaxially supported in said anode electrode and extending therefrom at both ends and comprising a solid portion and a hollow portion, insulating means electrically separating said portions, a filamentary cathode bridging said portions, an extension from said solid portion through said hollow portion and a seal between said extension and said hollow portion, said extension and said hollow portion being adapted to function as terminals for said filamentary cathode.

6. An electron discharge device comprising a cylindrical anode electrode adapted to be evacuated and forming a housing for auxiliary electrodes, conductor means coaxially supported in said anode electrode and extending therefrom at both ends and comprising a solid portion and a coextensive tubular portion, insulating means adjacent the center of said anode electrode separating said portions, a support extending radially from each of said portions and adjacent said insulating means, a filamentary cathode attached to said supports, an extension from said solid portion through said tubular portion and beyond the end thereof, and a seal between said extension and said tubular portion adjacent said end, said extension and said tubular portion being adapted to function as terminals for said filament outside said housing.

7. An electron discharge device in accordance with claim 6 wherein said insulating means comprises an annular member of ceramic material and said extension comprises a rod joined to said solid portion.

HERBERT A. FINKE.

REFERENCES CITED

The following references are of record in the file of this patent:

UNITED STATES PATENTS

| Number | Name | Date |
| --- | --- | --- |
| 2,109,843 | Kassner | Mar. 1, 1938 |
| 2,144,222 | Hollmann | Jan. 17, 1939 |
| 2,169,396 | Samuel | Aug. 15, 1939 |